United States Patent [19]

Hock

[11] Patent Number: 5,404,223
[45] Date of Patent: Apr. 4, 1995

[54] READOUT BEAMSPLITTING/COMBINING APPARATUS FOR RING LASER GYRO

[75] Inventor: Fromund Hock, Ronnenberg, Germany

[73] Assignee: Honeywell Inc., Mpls, Minn.

[21] Appl. No.: 690,886

[22] PCT Filed: Dec. 11, 1989

[86] PCT No.: PCT/EP89/01514

§ 371 Date: Mar. 23, 1992

§ 102(e) Date: Mar. 23, 1992

[87] PCT Pub. No.: WO90/07099

PCT Pub. Date: Jun. 28, 1990

[30] Foreign Application Priority Data

Dec. 14, 1988 [DE] Germany .................. 38 42 040.6
Apr. 18, 1989 [DE] Germany .................. 39 16 572.8

[51] Int. Cl.6 ........................................ G01C 19/66
[52] U.S. Cl. ................................................ 356/350
[58] Field of Search ........................ 356/350; 372/94

[56] References Cited

U.S. PATENT DOCUMENTS 4,582,429  4/1986  Callaghan .................. 356/350
4,865,452  9/1989  Ljung et al. ................ 356/350

FOREIGN PATENT DOCUMENTS 2127960  4/1984  United Kingdom .......... 356/350

*Primary Examiner*—Samuel A. Turner
*Attorney, Agent, or Firm*—Craig J. Lervick

[57] ABSTRACT

Figure 1:
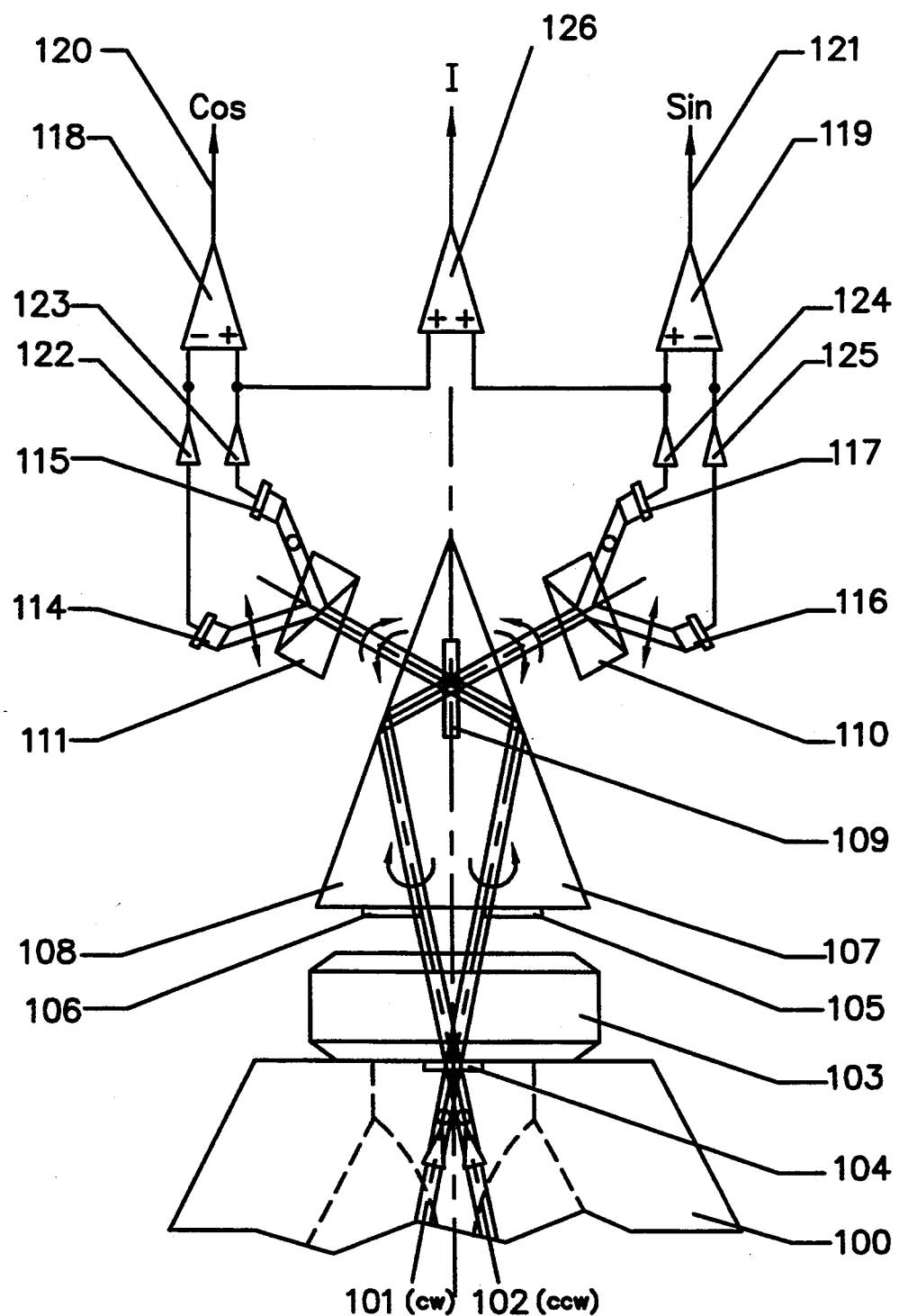

A readout apparatus for both partial beams (101,102) of a ring laser gyro (100) is designed strictly symmetrical so that each partial beam until its detection on a photodetector (114–117) travels the same path length. Both partial beams are differently polarized (105,106), are superimposed (107,108,109) and then again geometrically split-up (110,111) whereby a fixed phase relationship (90°) may be introduced between the split-up partial beams (FIG. 1).

9 Claims, 5 Drawing Sheets

READOUT BEAMSPLITTING/COMBINING APPARATUS FOR RING LASER GYRO

The present invention relates to a readout apparatus for a ring laser gyro according to the preamble of one of the independent claims.

In contrast to a passive Sagnac interferometer at which a light source is arranged outside of a ring resonator and at which the phase difference at a rotation of the ring resonator is evaluated a ring laser gyro is an active interferometer, at which the frequency of two counter-propagating waves is shifted in the event where the resonating cavity is rotated and where said frequency shift may be evaluated by means of a readout apparatus.

Hitherto known readout devices (see e.g. F. Aronowitz "The Laser Gyro" published in Laser Applications, Vol. 1, 1971, pages 137 to 140, Academic Press. Inc., New York and London) use a triple prism behind of a partially transmissive readout mirror whereat one beam directly propagates with an according refraction through said mirror and the opposite laser beam is superimposed to the laser beam by means of a triple total reflection and the provision of a small opening angle within said triple prism. For readout purposes the interference modulation of both superimposed counter-propagating laser beams is converted into electrical signals by means of the receiving surfaces of a double diode. The interference fringe width is given by the opening angle between both superimposed laser beams. The optical components effective in the beam path have an influence on the interference fringe distance due to the angle distortions to be tolerated. Furtheron the depth of modulation of the interference fringe pattern is influenced by the choice of the reflective factor of the backside reflective coating and the transmission losses of the triple prism.

The evaluation of the intensity modulation by means of said double diode results in quadrature signals necessary for the sign determination. The amplitude of the signal corresponds to the intensity integral of the light on the receiving surface. The phase of the signal is determined by the effective width of the gap between the receiving surfaces. A reduction of the beam intensity of the laser emission results in a reduction of the average constant light value and therefore to a not realizable migration of the reference point for the rotation of the electrical pointer which is defined by the pair of photodiode signals. This results in errors at the electrical evaluation of the interference phase. Therefore the signal characteristic of both signals depends on a plurality of manufacturing tolerances and the readout apparatus used until now rarely effects optimum signal conditions. Furtheron the known readout apparatus due to its non-symmetrical design is prone to vibrations and temperature changes, the modulation depth is small and occurence of error pulses cannot be precluded.

It is therefore the object of the present invention to devise an improved readout apparatus which is insensitive to vibrations and temperature changes which comprises a large modulation depth and which allows to adjust the phase shift between the signals exactly to 90° so that occurence of error pulses is precluded to a large extent.

The solution of this object is achieved according to the characterizing features of the independent claims. Further advantageous embodiments of the inventive reatout apparatus may be taken from the dependent claims.

Herewith the inventive readout apparatus makes use of known polarizing beam splitting and phase shifting means as they are shown and described in the doctor thesis "Photoelektrische Messung der Änderung von Längen oder Winkelpositionen mit Hilfe von Beugungsgittern", Stuttgart 1976, author: Dipl-Phys. Fromund HocK. The present invention is to be seen in the use of such means in a strictly symmetrical design for superimposing both counter-propagating laser beams within an active ring laser gyro.

Figures 2, 2A:
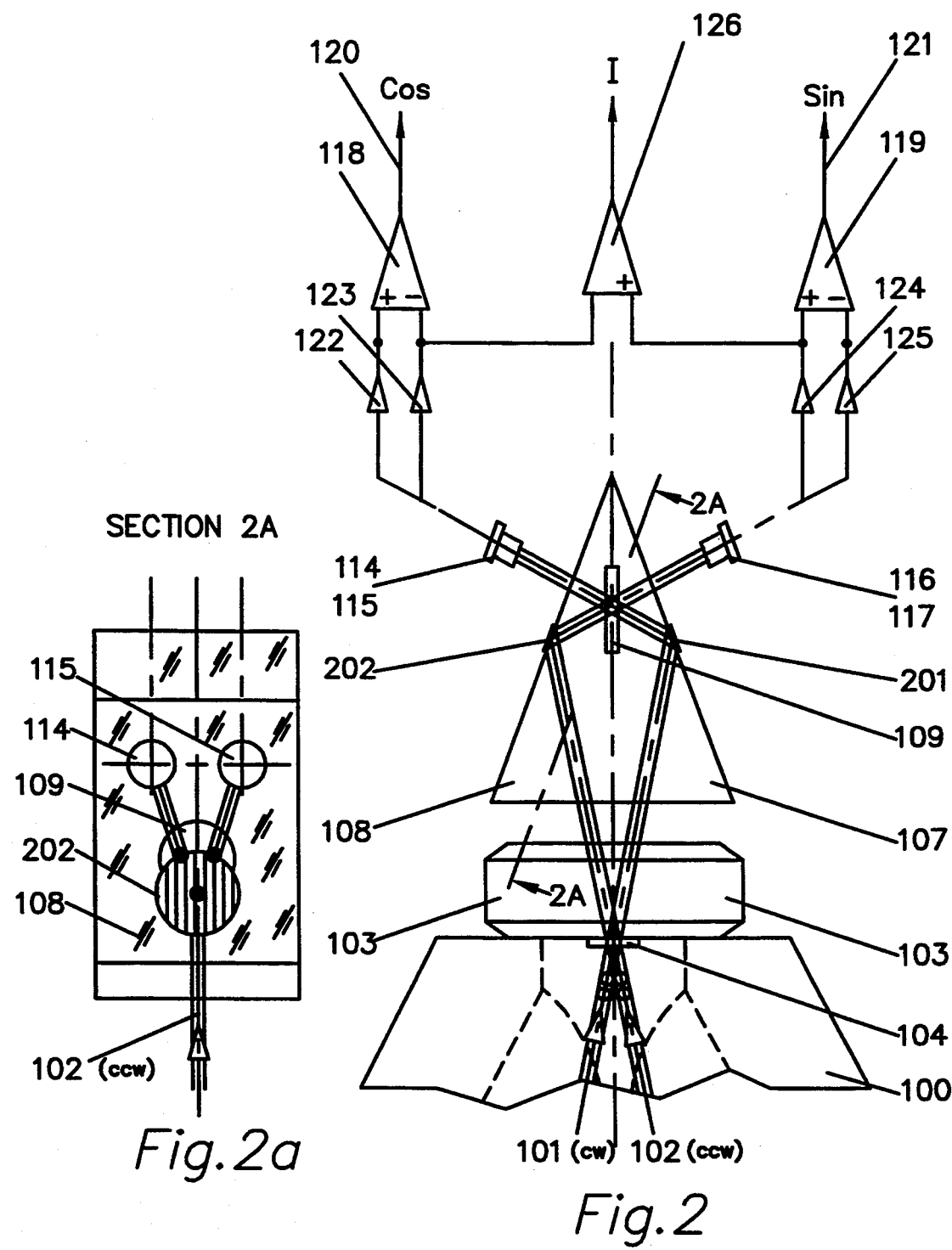
Figures 3, 3A:
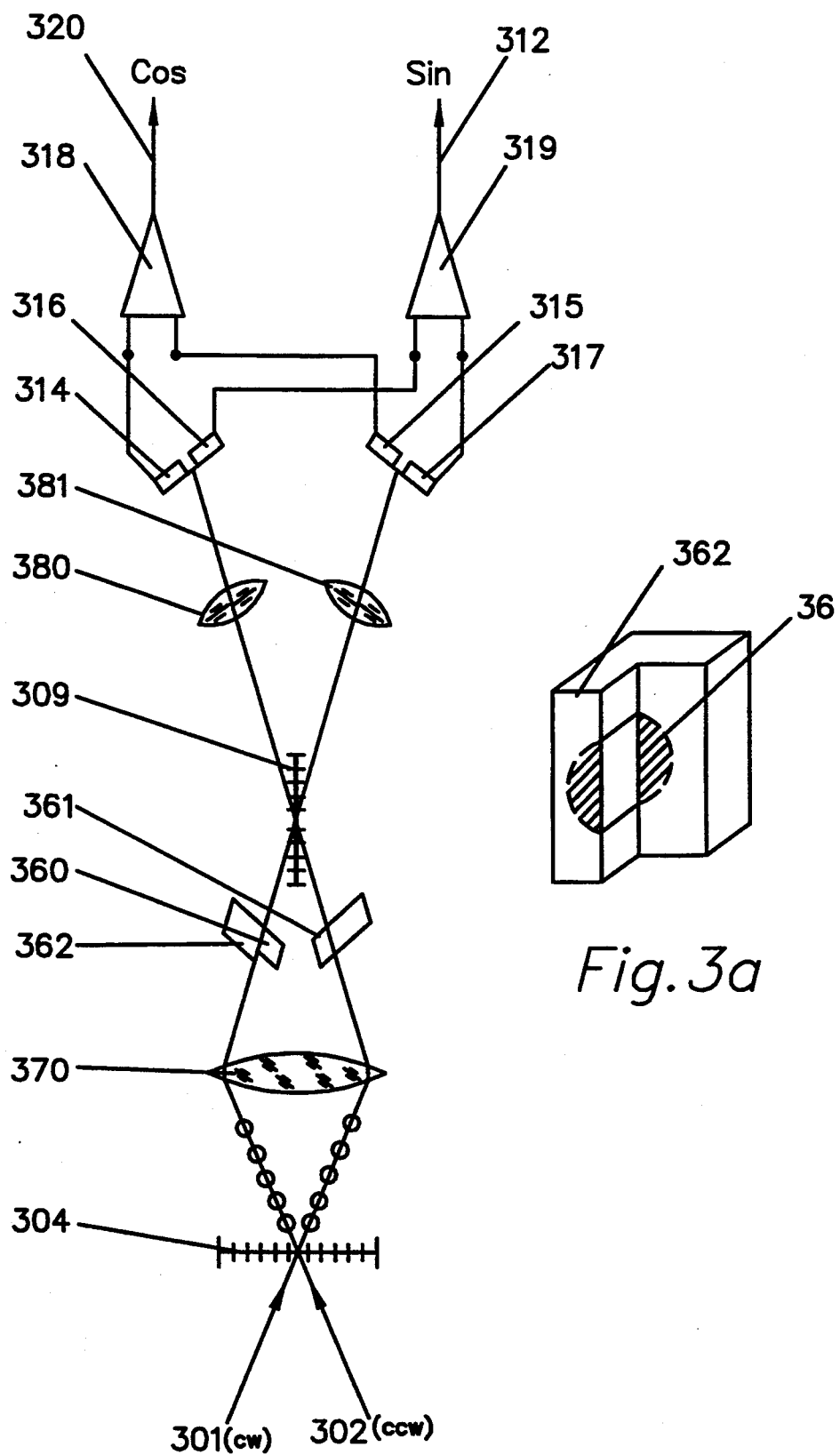
Figures 4, 4A:
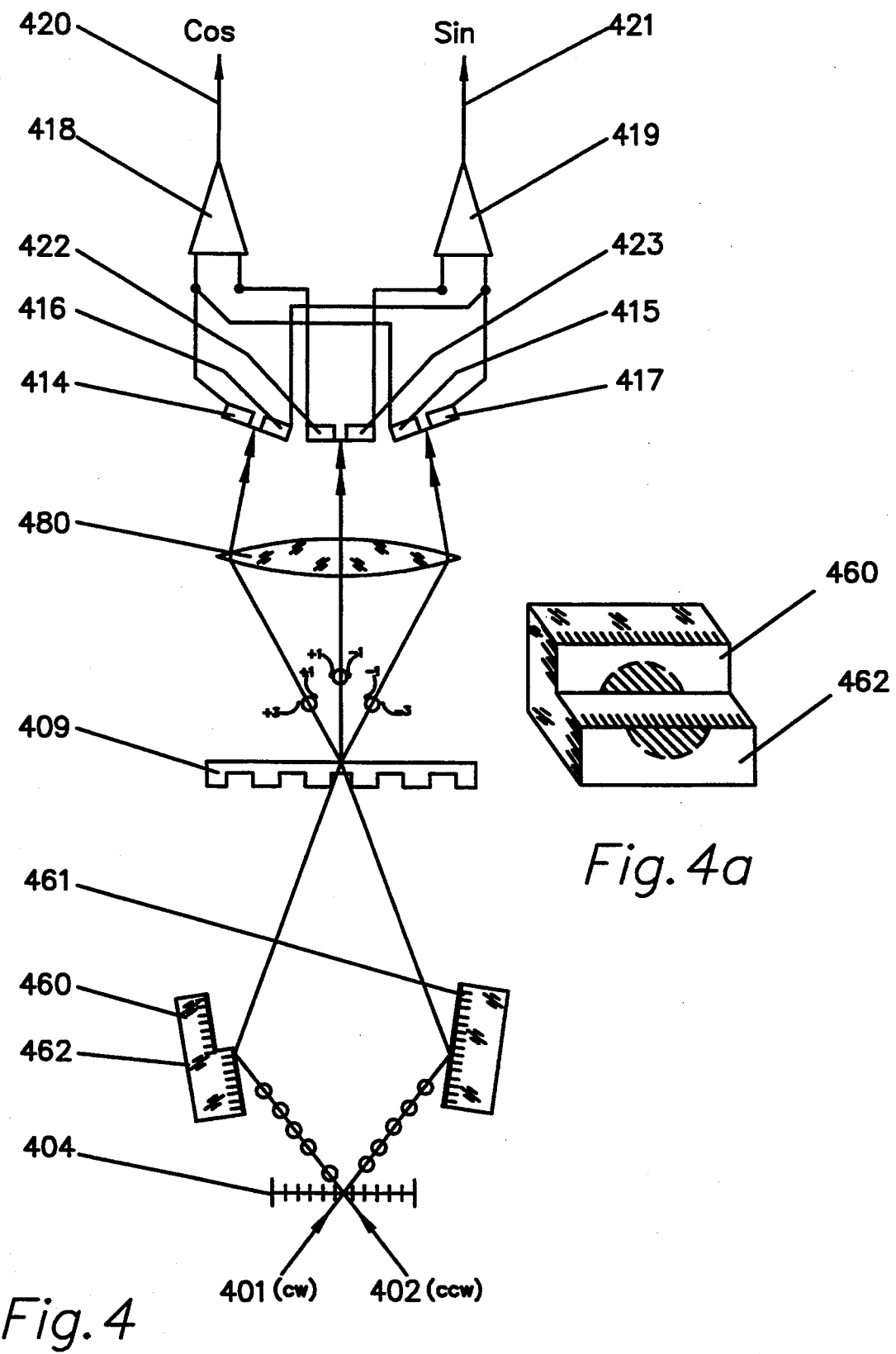
Figure 5A:
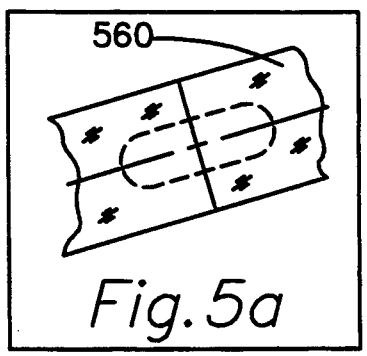
Figure 5:
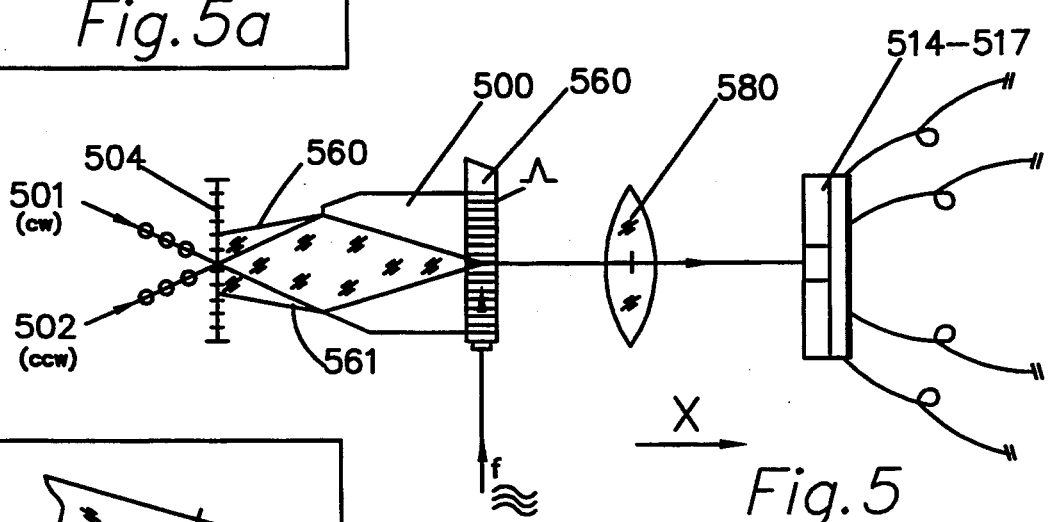
Figure 5B:
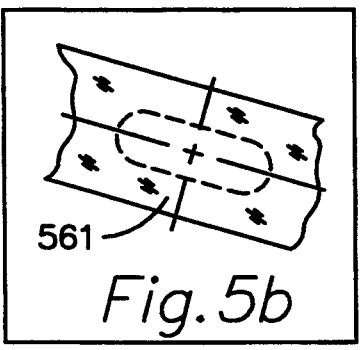
Figure 5C:
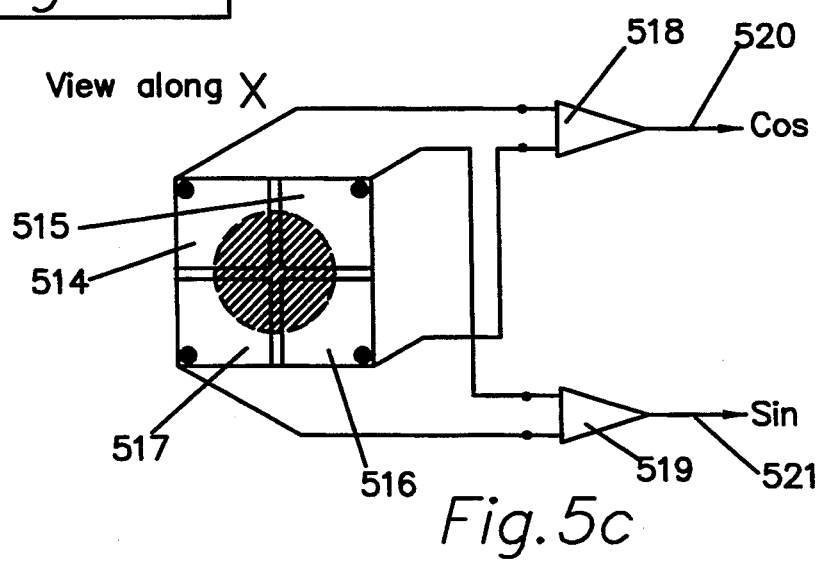

With respect to the figures of the attached drawings embodiments of the inventive readout apparatus shown there shall be further described in the following. It shows:

FIG. 1 a first embodiment of an inventive readout apparatus;

FIG. 2 a second embodiment of an inventive readout apparatus;

FIG. 2a a sectional view along line A-B in FIG. 2;

FIG. 3 a third embodiment of an inventive readout apparatus;

FIG. 3a a perspective view of an optical component used in FIG. 3;

FIG. 4 a fourth embodiment of an inventive readout apparatus;

FIG. 4a a perspective view of an optical component used in FIG. 4;

FIG. 5 a fifth embodiment of an inventive readout apparatus;

FIGS. 5a,b plan views of components essentially for the implementation of the invention; and FIG. 5c a signal evaluation device in further details.

According to FIG. 1 a conventional ring laser gyro 100 comprises a triangular-shaped resonator path along which two laser beams 101 and 102 are propagating in opposite directions. The clockwise (cw) propagating laser beam 101 as well as the counterclockwise (ccw) propagating laser beam 102 impinge on a partly transmissive mirror 104 which is arranged on a mirror substrate 103. The mirror substrate 103 consists preferably of glass ceramics (Zerodur) whereat the connection between the mirror substrate 103 and the ring laser gyro 100 is made by polishing and an optical contact. As far as the device hitherto has been described it deals with an conventional ring laser gyro.

Within the path of the laser partial beams cw-101 and ccw-102 leaving the mirror substrate 103, e.g. mica plates 105, 106 acting as λ/4 retarders are provided with their main oscillation direction being oriented under ±45° to the polarization directions so that the linear polarized light within the laser is converted into oppositely circular polarized light. The mica plates 105, 106 are arranged on the bottom side of two prism halfes 107, 108 which are cemented with each other under inserting a polarization neutral beam splitting layer 109 so that a triangular-shaped configuration results. This triangular-shaped configuration 107, 108 basically also may be connected to the mirror substrate 103.

At the beam splitting layer 109 the oppositely circular polarized partial laser beams each are superimposed and after leaving the triangular-shaped configuration 107,108 each are applied to a Wollaston prism 110, 111 which acts as a polarization beam splitter and splits up both circular polarized partial beams into partial beams being orthogonally polarized with respect to each other and each being fed to photodiodes 114, 115 or 116, 117 respectively. The Wollaston prisms 110, 111 are rotated with respect to each other and with respect to the beam axis by 45°. Herewith push-pull modulated signals arise at the photodiodes 114–117, which are subtracted by means of differential amplifiers 118, 119 whereby the DC components are compensated to zero whereas the AC components are added in the desired manner. By means of preamplifiers 122–125 the signal amplitudes may be adjusted to the same values whereas the modulation phase by angle tuning of one of the Wollaston prisms 110, 111 may be exactly adjusted to 90°. At the outputs 120, 121 of the amplifiers 118, 119 therefore the desired quadrature signals may be taken. A further amplifier 126 may be used in order to gain an intensity signal I for the path length control of the resonator.

The above described new readout apparatus shows a strictly symmetrical design resulting in a high insensitiveness against invironment influences as e.g. vibrations and temperature changes. Due to the large modulation depth and the adjustable phase relationship it is possible to use a small threshold value for the connected evaluation electronics. By a reduction of the pulse width furtheron the phase noise of the output pulses may be reduced so that error pulses are suppressed by a large extent.

A readout apparatus of this type may be fixed to the housing as shown in FIG. 1 or may be fixed to the block of the ring laser gyro 100. When fixed to the housing a compensation of the commonly provided auxiliary oscillation (dither movement) may be implemented by accordingly choosing the optical effective material within the beam path before the beam combining as well as by the selection of the rotation axis of the auxiliary oscillation and the readout spot. Herewith it is helpful that the optical paths of both beams are changed in opposite senses so that the effect used for the compensation of the auxiliary oscillation is remarkably larger than with a conventional readout apparatus.

When fixed to the block the readout apparatus shows a more compact design which is in particular insensitive against shock and vibration stresses. The compensation of the auxiliary oscillation in this event has to be done electronically which due to the better signal quality in particular with respect to the phase information may be better implemented than with a conventional readout apparatus.

In the FIGS. 2, 2a a further embodiment of a readout apparatus is shown. This embodiment comprises with the exception of both mica plates and both Wollaston prisms all elements of FIG. 1. The pairs of photodiodes 114, 115; 116, 117 however are arranged in tandem normal to the drawing plane. The function of the mica plates and the Wollaston prisms is taken over by means of two phase gratings 201, 202 which split-up each impinging laser beam into two deflected partial beams. Both partial beams with respect to the +first and the −first diffraction order at an intensity of approximately 40,5% comprise an aperture angle which is defined by the grating constant and the laser wave length. The location of the phase grating within the beam path defines the phase between both diffracted beams.

In order to interfere both diffracted beams, which are derived from both beams 101 and 102 from the readout mirrors 103, 104, both gratings 201, 202 must have the same grating constant and must be arranged in the same distance from the beam combining spot.

Since both phase gratings are phase-shifting by adjusting one component the phase may be exactly adjusted to 90°. Therefore the four receiving surfaces of the photodiodes 114 to 117 each receive two signal pairs having a phase shift of 90° which may be processed in the same way as in FIG. 1 so that the sign of the difference frequency and therefore the rotation direction of the ring laser gyro may be evaluated.

Of course the phase gratings 201, 202 also may be arranged in the transmissive light path on the bottom side of the triangular-shaped configuration 107, 108. Also in the present case the readout apparatus may be fixed to the housing as well as to the block.

According to FIG. 3 a readout apparatus is shown which makes use of means for geometrical beam splitting and phase shifting.

The clockwise propagating partial beam cw-301 and the counter-clockwise propagating partial beam ccw-302 again are readout by means of a partially transmissive mirror 304. A focus lens 370 focuses both diverging partial beams. The partial beams converging behind of the focus lens 370 penetrate two transmissive plates 360 and 361. The one plate 360 supports a dielectrical step 362 covering one half of the beam cross section so that the penetrating wave portion with respect to the adjacent wave portion is retarded in its phase by $\lambda/4$ (90°).

The partial beams penetrating both plates 361; 360, 362 are partly reflected and partly transmitted by a partially transmissive mirror 309, so that push-pull modulated beams arise which are imaged onto photoreceiver pairs 314, 316 and 315, 317 by means of two lenses 380, 381 in the form of two semicircular fields. The signals produced by the photoreceiver pairs each are shifted with respect to each other by 90° in the phase so that at the outputs 320, 321 of the differential amplifiers 318, 318 again quadrature signals (cos, sin) result.

FIG. 3a shows in a perspective view the plate 360 comprising the phase shifting step 362 where this plate with respect to the bundle cross section has to be arranged in such a way that one half of the bundle cross section with respect to the other partial beam is not shifted in its phase whereas the other half of the bundle cross section with respect to the other partial beam experiences a phase shift by 90°.

According to FIG. 4 mirror plates 461; 460, 462 are used instead of plates in the transmissive light with said mirror plates converging the partial beams 401, 402 diverging from the partially transmissive mirror 404, whereat the mirror plate 460 supports a mirror step 462 having a height according to $\lambda/8$ so that the back and forth propagating beam totally is shifted in its phase by 90°. As a beam combiner in the present case serves a loss-free laminar phase grating with suppressed $0^{th}$ diffraction order with its grating constant being matched to the angle of the impinging beams and to the wave length of the used laser light. The beams according to the ±third diffraction order are push-pull modulated with respect to the beams according to the ±first diffraction order. Those diffracted beams are focused by a lens 480 and imaged onto three photocell pairs 414 to 417, 422, 423, whereat the bundle cross sections each comprise halfs which are shifted in their phases by 90°. The output signals of said three photocell pairs are connected to two differential amplifiers 418, 419 showing at their outputs 420, 421 quadrature signals with sin- and cos-modulation.

FIG. 4a shows in a perspective view the mirror plate 460 comprising the mirror step 462 for phase shifting of one half of the bundle cross section. In the event where the ring laser gyro is dithered about an axis fixed to the housing the readout apparatus according to FIG. 4 may be provided with a phase grating 409 having a beam combining grating structure with the grating lines being staggered in their grating phase in such a way that the frequency modulation of the moved partial beams at the stationary phase grating is compensating the frequency modulation of the ring laser modes due to the dithering (dither compensation). The location of the rotational axis and the dimensioning of the optical transmission means between the readout mirror 404 and the phase grating 409 has to be choosen accordingly. The beam receivers and the matched optics have to share the dither motion so that the local fixed relationship between the beam cross sectional area to the receiving area of the photodiodes is maintained.

According to FIG. 5 a prism 500 comprises totally reflecting deflection surfaces 560, 561 onto which the partial beams cw-501 and ccw-502 impinge which are readout by the partially transmissive mirror 504. The deflection surface 560 comprises transversely to the impinging partial beam 502 a phase shifting step (see FIG. 5a) and the deflection surface 560 comprises parallel to the impinging partial beam 501 a phase shifting step (see FIG. 5b). The steps are symmetrically arranged with respect to the beam cross section and they introduce a 90° phase shift with resepct to each adjacent beam half. An acoustooptical cell 590 combines the partial beams by lattice diffraction and a lens 580 images the superimposed phase shifted images onto a photodiode device 514 to 517 as it is shown in FIG. 5c. The output signals of the photodiodes 514 to 517 are fed to two differential amplifiers 518, 519 showing at their outputs 520, 521 quadrature signals with sin- and cos modulation.

The acoustooptical cell 590 is a phase grating which is moved by a travelling ultrasonic wave. This phase grating shifts the frequency of the partial beams of the laser modes according to a fundamental driving frequency of the acoustooptical cell and according to the ordinal number of the diffraction order. With preference the driving frequency of the acoustooptical cell by means of a frequency/phase control loop may be maintained within a fixed relationship to a mechanical auxiliary rotation (dither) of the ring laser gyro in such a way that the frequency shift of the laser modes due to the auxiliary rotation is compensated by the acoustooptical frequency shift of the laser modes at the diffracting beam combination. This results in a clever possibility for dither compensation.

I claim:

1. Readout apparatus for a ring-laser-gyro at which two laser beams are propagating in opposite directions, are decoupled from a ring resonator by means of a partially transmissive mirror and are imaged on detector by means of a beam splitting device, characterized in that the beam splitting device is symmetrically designed in order to provide the same path length for each beam and that it comprises:
   means (105, 106) for polarizing both partial beams (cw-101, ccw-102) in opposite senses using λ/4 retarders (105, 106);
   means (107, 108, 109) for superimposing both oppositely polarized partial beams, comprising a symmetrical deviating prism which includes two prism halves (107, 108) cemented with each other having a polarization neutral beam splitting layer (109) interposed therebetween and having totally reflecting lateral faces; and
   means (110,111) for geometrically splitting both superimposed partial beams and for inserting a phase shift between both partial beams before imaging them on the detectors (114–117) said means for beam splitting and phase shifting being wollaston prisms (110, 111) which are rotated with respect to each other in beam axis.

2. Readout apparatus for a ring laser gyro at which two laser beams are propagating in opposite directions, are decoupled from the ring resonator by means of a partially transmissive mirror and are imaged on detectors by means of a beam splitting device, characterized in that the beam splitting device is symmetrically designed in order to provide the same path length for each beam and that it comprises:
   means (201,202) for splitting both partial beams by means of diffraction;
   a displacement of said splitting means with respect to each other for inserting a phase relationship; and
   means (107,108,109) for superimposing said splitted and phase shifted partial beams in order to image them on said detectors (114–117).

3. Apparatus according to claim 2, characterized in that,
   the means for splitting both partial beams are implemented by phase gratings (201,202); and
   the means for superimposing both splitted partial beams comprises a symmetrical deviating prism which consists of two prism halves (107,108) cemented with each other under inserting a polarization neutral beam splitting layer (109) with said phase gratings being mounted on the lateral faces or the base face, respectively, whereat the phase relationship is provided by adjusting the deviating prism.

4. Readout apparatus for a ring laser gyro at which two laser beams are propagating in opposite directions, are decoupled from a ring resonator by means of a partially transmissive mirror and are imaged on detectors by means of a beam splitting device, characterized in that the beam splitting device is symmetrically designed in order to provide the same path length for each beam and that it comprises:
   means (360, 362; 460, 462; 560, 561) for geometrically beam splitting and phase shifting including a dielectrical step (362, 462, 560, 561) inserted into at least one partial beam, which covers a half of the beam cross section and which implements a λ/4 phase shift within the transmitted or reflected light beam.

5. Apparatus according to claim 4, characterized in that the means for superimposing the splitted and phase shifted partial beams comprise a partially transmissive mirror (309).

6. Apparatus according to claim 4, characterized in that the means for superimposing the splitted and phase shifted partial beams comprise a laminar phase grating (409).

7. Apparatus according to claim 4, characterized in that, the means for superimposing the splitted and phase shifted partial beams comprise an acoustooptical cell (590).

8. Apparatus according to claim 7, characterized in that in front of the acoustooptical cell (590) a prism (500) is arranged which comprises at reflecting faces (560,561) phase shifting mirror steps arranged normal to each other in order to geometrically split up the beam into 4 quadrants with different phase relationship.

9. Apparatus according to claim 7, characterized in that the driving frequency of the acoustooptical cell (590) is related to a mechanical auxiliary rotation of the ring laser gyro (100) in order to eliminate phase shifts due to the auxiliary rotation.

* * * * *